United States Patent [19]

Adams

[11] 4,290,344
[45] Sep. 22, 1981

[54] GEAR ASSEMBLY

[75] Inventor: Frederick J. Adams, Clevedon, England

[73] Assignee: Cam Gears Limited, Hertfordshire, England

[21] Appl. No.: 16,425

[22] Filed: Mar. 1, 1979

[51] Int. Cl.$^3$ .......................... F15B 11/08; B62D 1/20; F01B 3/00
[52] U.S. Cl. ..................... 91/467; 74/89.15; 74/499; 92/31
[58] Field of Search ................ 91/467; 74/89.15, 499; 92/31

[56] References Cited

U.S. PATENT DOCUMENTS

| | | | |
|---|---|---|---|
| 2,765,778 | 10/1956 | Gerry | 92/31 |
| 3,121,345 | 2/1964 | Zeigler | 74/499 X |
| 3,315,413 | 4/1967 | Beecher | 74/89.15 X |
| 3,754,479 | 8/1973 | Elser | 74/499 |
| 3,868,888 | 3/1975 | Rehfeld | 74/499 X |

FOREIGN PATENT DOCUMENTS 1439499 6/1976 United Kingdom .................... 92/31

Primary Examiner—Edward J. McCarthy
Attorney, Agent, or Firm—Yount & Tarolli

[57] ABSTRACT

A gear assembly: a gear assembly which is used in a power assisted steering system of a vehicle.

The gear assembly comprises a piston (1) within a cylinder (2), the piston (1) being axially displaceable in response to an input shaft (4). The piston (1) is axially rotatable by means of a track (18) and track follower (19) in response to axial displacement. Splines (40) on the piston (1) intermesh with teeth (42a) of a take off part (42) which is laterally spaced and in side by side relationship with the piston. By rotation of the piston (1) an output shaft (44) of the take off part (42) is rotated. In a modification of the take off part instead of being in side by side relationship is an extension of the piston and the track is of variable curved portions.

17 Claims, 8 Drawing Figures

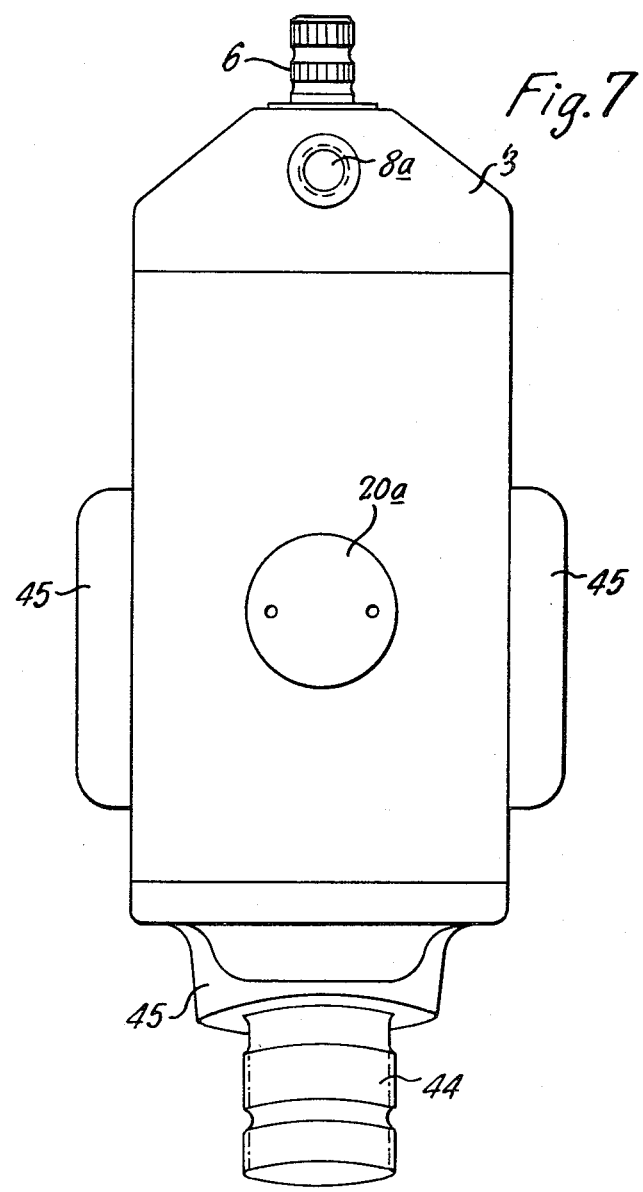

GEAR ASSEMBLY

TECHNICAL FIELD

This invention relates to a gear assembly, preferably for use in variable ratio power assisted steering assemblies.

PRIOR ART

Steering assemblies are known in which an input shaft drives a longitudinally displaceable nut by rotational movement of the input shaft. The nut in turn drives an output shaft which shaft lies substantially along the same axis as the input shaft. Such a gear assembly is the subject matter of British Patent Specification No. 907,081. Rotary motion is imparted to the nut by means of a track of a symmetrical helix and a track follower. One disadvantage of such a steering assembly however is that it is not adapted for use in a variable ratio gear assembly since the track, which together with the track follower imparts rotational motion to the nut and consequently to the output, is symmetrically helical and thus provides a fixed ratio steering assembly.

STATEMENT OF INVENTION AND ADVANTAGES

To alleviate this disadvantage according to the present invention there is provided a variable ratio gear assembly comprising a displaceable member which is movable along a longitudinally extending axis relative to a housing and is restrained from axial rotation relative to the housing; an axially rotatable input part which is secured against axial displacement relative to the housing and is coupled to said displaceable member so that rotation of the input part effects an axial displacement of the displaceable member; a take-off part capable of controlled axial rotation relative to the housing which rotation is available as an output of the gear assembly; said displaceable member being coupled to the housing by a first coupling means and to the take-off part by a second coupling means, the one of the coupling means imparting rotational movement to the take-off part, at least one of the coupling means comprising an axially extending track of one or more variable curved portions and a track follower which co-operates therewith, one of said track and track follower being secured relative to the displaceable member for longitudinal displacement therewith and the other being secured relative to the housing part against longitudinal displacement. Preferably the one or more variable portions is a helix of variable pitch.

Further according to the present invention there is provided a gear assembly comprising a displaceable member which is movable along a longitudinally extending axis relative to a housing and is restrained from axial rotation relative to the housing, said displaceable member being coupled to the housing by a first coupling means to impart controlled limited axial rotation of the displaceable member relative to the housing, an axially rotatable input part which is secured against axial displacement relative to the housing and is coupled to said displaceable member so that rotation of the input part effects axial displacement of the displaceable member, a take-off part, laterally spaced and in side-by-side relationship with respect to the input part, the take-off part having an output part capable of controlled axial rotation relative to the housing, said displaceable member being coupled to the take-off part by a second coupling means, said second coupling means being adapted to cause axial rotation of the take-off part in response to controlled axial rotation of the displaceable member.

The input part will usually be in the form of a shaft and the displaceable member will usually be in the form of a nut driven longitudinally by rotation of the shaft through a screw coupling and for convenience such input part and displaceable member will hereinafter be referred to as a shaft and nut respectively.

In a simple form of the gear assembly the take-off part can be integral with, or a rigid extension of, the nut and the coupling provided by the co-operating track and track follower is effected directly between the nut and the housing, one of the track and the track follower being secured on the housing and the other being carried by the nut. In this simple arrangement the means for restraining relative axial rotation between the nut and housing is conveniently provided by co-operation between the track and its follower.

Usually the track will be in the form of a longitudinally extending non-rectilinear groove and the track follower in the form of a peg or other projection which engages within the groove. For convenience of manufacture the grooved track will usually be machined in the peripheral surface of the nut to receive a follower peg projecting inwardly of the housing wall within which the nut is displaceable. Alternatively the track and track follower can be in the form of co-operating threads (such as Acme type threads).

By the present invention the co-operation of the non-rectilinear track and track follower causes the output part to exhibit controlled axial rotation as the nut is driven longitudinally relative to the housing and which rotation is predetermined by the shape of the track. Consequently by appropriate shaping of the track and selection of the screw coupling between the shaft and the nut the gear assembly can be provided with a predetermined gear ratio between the shaft and the take-off part and such gear ratio can be constant or variable. The track will usually be of helical shape although it is envisaged that other non-rectilinear forms are possible, for example, the track can have combinations of one or more curved length portions and one or more rectilinear length portions to provide a desired programme or rotational pattern of movement to the take-off part and/or a desired programme for varying the gear ratio between the rotation of the shaft and the rotation of the take-off part.

In the previously mentioned simple arrangement in which the take-off part is integral with, or a rigid extension of, the nut, such part will be subjected to both axial displacement and controlled rotation with the nut. In some applications it may be beneficial for the gear assembly to provide both an axial and a rotational output part with an appropriate gear ratio to each as determined by the screw means for driving the nut longitudinally and the co-operating track and track follower for determining the extent of the axial and rotational output which is derived by rotation of the shaft. For example, the nut can be provided with a worm or rack which drives a sector or pinion respectively the latter of which is rotatably mounted on the housing so that during axial displacement of the nut the sector or pinion is rotated whilst the nut can rotate relative to the sector or pinion (as determined by the track and track follower) to vary the gear ratio between the worm and sector (or the rack and pinion as the case may be). Also in the gear assembly according to the invention in which the take-off part provides an output part which allows axial rotation only, the second coupling means effectively absorbs the axial displacement of the nut but transmits the controlled axial rotation of the nut to the take-off part. A convenient construction for the second coupling means is achieved by mounting the take-off part to be axially displaceable relative to the nut and secured for axial rotation in unison with the nut, the output part also being secured against axial displacement relative to the housing. By this latter arrangement the nut will move axially towards or away from the output part during displacement of the nut relative to the housing while such output part is rotated in unison with the nut in accordance with the control effected by the co-operating track and track follower. The second coupling means is conveniently provided by co-operating axially extending splines or one or more co-operating tracks and track followers provided between the take-off part and the nut or an extension thereof.

In a more complex structure of the gear assembly the aforementioned second coupling means can be utilised to provide the, or additional, controlled rotation to the take-off part. In one form of this proposal the nut is inhibited from exhibiting axial rotation relative to the housing whilst being displaced longitudinally through the housing by rotation of the shaft (such inhibition of rotation of the nut conveniently being effected by a projection in the housing which engages in and is longitudinally slidable along a rectilinear channel in the nut which channel extends parallel to the longitudinal axis). The track and track follower are effectively incorporated in the second coupling means so that as the nut is displaced axially relative to the housing and to the take-off part and without exhibiting rotation, relative axial displacement between the track and its co-operating follower causes the take-off part to exhibit controlled axial rotation in accordance with the shape of the track. In a preferred embodiment of this latter arrangement the nut or an extension thereof is provided with the longitudinally extending non-rectilinear track (usually a helical track as aforementioned) while the take-off part is provided with a peg or other projection which engages with the track and slides therealong during relative longitudinal displacement between the nut and take-off part whilst rotation is imparted to the take-off part through the peg or other projection. In a further embodiment the take-off part engages with the nut through a screw thread in the form of the track and track follower, such as a conventional Acme thread, so that as the nut is displaced axially and without rotation the output part is rotatably driven through the screw thread.

If required, the rotary motion exhibited by the output part can be programmed by having a non-rectilinear track and track follower arrangement in the second coupling means as abovementioned and also a second non-rectilinear track and co-operating track follower arrangement between the nut and the housing so that as the nut is driven longitudinally relative to the housing it is subjected to controlled axial rotation and this controlled axial rotation of the nut can modify the rotation transmitted by the co-operating track and track follower between the nut and the take-off part in providing the controlled rotation for the take-off part.

The gear assembly of the present invention can include power assistance means whereby valve means associated with the input part is controlled upon rotation of the input part to direct fluid under pressure to assist in the longitudinal displacement of the nut relative to the housing. The nut can therefore be in the form of a piston which is longitudinally displaceable in a piston cylinder formed by the housing and which nut together with its cylinder constitutes a double acting piston and cylinder device to the opposing chambers of which fluid under pressure is directed or exhausted as appropriate to assist in displacement of the nut by actuation of a valve means. In a preferred embodiment the valve means is a conventional torque operated valve through which the input shaft to the nut is rotatably driven; such torque valves, usually incorporating a torque bar which resists actuation of the valve upon a rotational input being applied thereto, are well known in the art of power assisted steering gears.

The screw means by which the shaft and nut are coupled together is preferably a re-circulating ball and worm thread arrangement although it will be appreciated that other screw means can be utilised such as conventional co-operating helical threads.

Although the gear assembly of the present invention is capable of wide industrial application such as in the control of machine tool components, it was primarily developed for use in vehicle steering and there is therefore provided a vehicle steering gear assembly when incorporating a gear assembly in accordance with the present invention. In a vehicle steering gear the steering output will usually be derived by utilising the rotation of the take-off part to displace a drop arm or similar extending linkage; alternatively the steering output can be derived primarily from axial displacement to which the nut is subjected, for example by displacement of the nut driving a worm and sector steering linkage.

Embodiments of gear assemblies constructed in accordance with the present invention and applied to vehicle steering gears will now be described, by way of example only, with reference to the accompanying illustrative drawings, in which;

FIG. 7 is a side view of the gear assembly of FIG. 6.

For convenience of description the same parts or members as referred to in each of the FIGURES have been accorded the same references.

Figure 1:
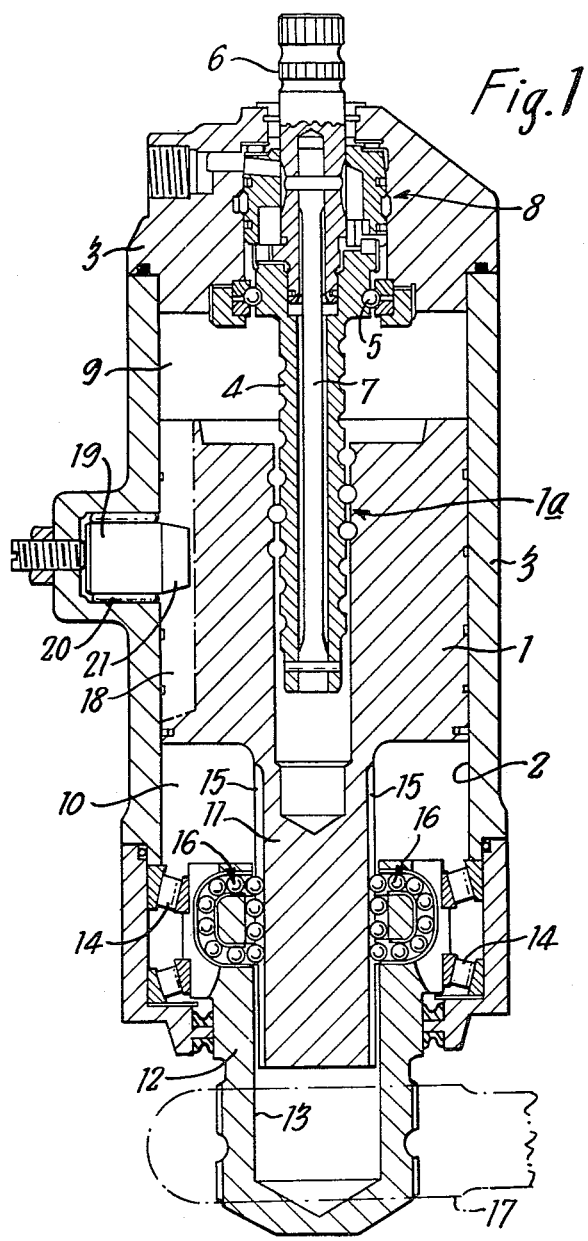
FIG. 1 is a longitudinal section of a first embodiment of a power assisted gear assembly according to the invention for use with a drop arm linkage.
Figure 2:
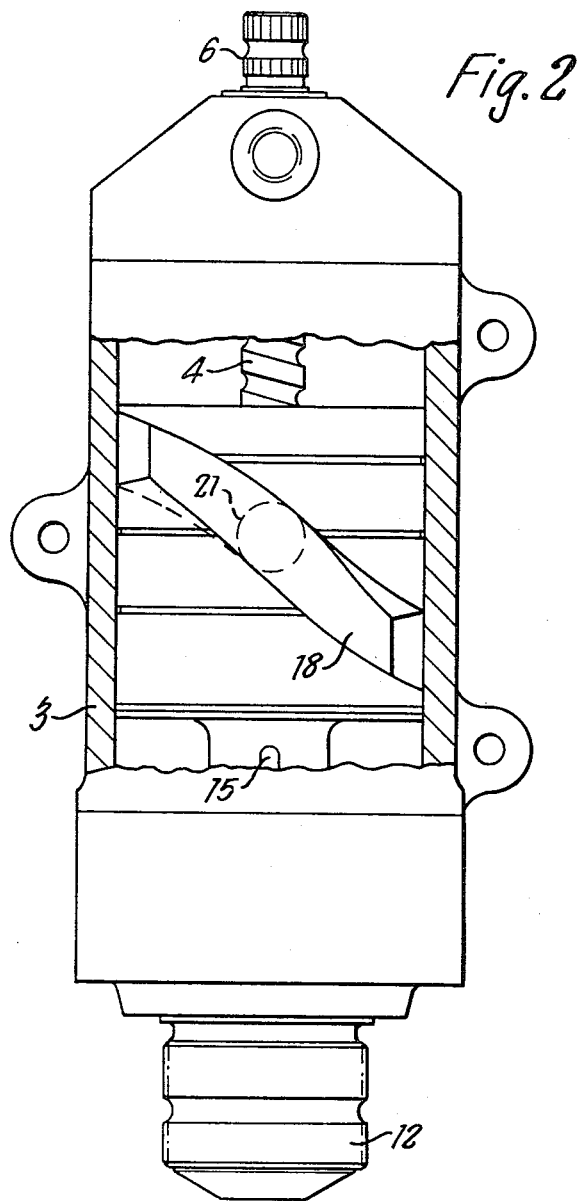
FIG. 2 is a side elevation of the gear assembly shown in FIG. 1 in which the housing is shown in part section to illustrate the non-rectilinear longitudinally extending track in the gear assembly.

The gear assembly of the embodiment of FIGS. 1 and 2 has a cylindrical piston 1 which is axially slidable in a longitudinally extending cylinder 2 formed by a gear housing 3. The piston 1 is formed by a re-circulating ball nut which is coupled through a re-circulating ball and worm thread system 1a with a shaft 4 co-axial with the piston 1. The shaft 4 is axially rotatable in bearings 5 relative to the housing 3 and is retained against axial displacement relative to the housing 3 so that, if the piston 1 is restrained against axial rotation relative to the housing 3, upon rotation of the shaft 4 the piston 1 is displaced longitudinally within the cylinder 2. Co-axial with the shaft 4 and mounted in tandem therewith is a coupling shaft 6 which extends from the housing 3. The shaft 6 is mounted for rotation relative to the housing 3 and is connected to the shaft 4 by a torque rod 7 so that upon rotation of the coupling shaft 6 in response to a steering input, rotation is imparted to the shaft 4 whilst the torque rod 7 permits a limited amount of rotational displacement of the shaft 6 relative to the shaft 4. This latter rotational displacement between the shafts 6 and 4 is utilised to control torque responsive valve means shown generally at 8. The piston 1 forms with its cylinder 2 axially opposed chambers 9 and 10 to which hydraulic fluid under pressure is intended to be directed and exhausted as appropriate for a double acting piston and cylinder arrangement. This control of hydraulic fluid is effected by the valve means 8 to pressurise one of the chambers 9 and 10 while the other is exhausted to ensure that fluid pressure assistance is provided for displacement of the piston 1 in the appropriate longitudinal direction in accordance with that in which it is screw driven by rotation of the shaft 4. The torque valve 8, the coupling between the shafts 4 and 6 and the fluid control system to the chambers 9 and 10 can be conventional for power assisted steering gears and an appropriate arrangement is described in our associate company TRW Inc's British Patent Specification No. 1,469,734.

Integral with the piston 1 and extending co-axially therefrom is a cylindrical piston rod 11 which is connected through a coupling with a take-off member 12 extending longitudinally from the housing 3. The take-off member 12 has a blind bore 13 which is co-axial with and slidably receives the piston rod 11 and this member 12 is mounted in bearings 14 within the housing 3 so that it is axially rotatable relative to the housing and is retained by the bearing 14 against axial displacement relative to the housing. The coupling between the piston rod 11 and the take-off member 12 comprises a peripherally spaced array of straight channels (two of which are shown at 15) in the piston rod 11 which extend parallel to the axis thereof. Respectively engaging one with each of the channels 15 are a peripherally spaced array of re-circulating ball bearing systems 16 mounted in the take-off member 12. The co-operation between the channels 15 and bearing systems 16 permits the piston rod 11 to move axially relative to the take-off member 12 and within the blind bore 13; however, this co-operation also ensures that if the piston 1 and thereby its rod 11 is subjected to axial rotation the take-off member 12 will be subjected to axial rotation in unison therewith. The take-off member 12 is intended to be coupled to a swing lever (indicated at 17) for control of a steering linkage which control is intended to result from rotation of the lever 17 in unison with the take-off member 12.

As previously mentioned, the piston 1 will be driven axially through the cylinder 2 upon rotation of the shaft 4 provided that the piston is restrained from exhibiting axial rotation in unison with the shaft 4. Such restraint upon rotation of the piston 1 is provided by a longitudinally extending track 18 and a track follower 19 engaging therewith. The track 18 is machined in the cylindrical surface of the piston 1 and is of longitudinally extending helical form as shown in FIG. 2. The track follower 19 is formed by a substantially cylindrical peg the axis of which extends radially relative to that of the piston 1 and is secured relative to the housing 3. The peg 19 is mounted to exhibit rotation about its axis and relative to the housing 3 in needle rollers 20 and the radially inner end of the peg is provided with a frusto-conical nose 21 which co-operates with the track 18.

By providing the helical track 18 and the peg 19 which co-operates therewith, the piston 1 is restrained from rotating relative to its cylinder 2. However, when the shaft 4 is rotated to drive the piston 1 longitudinally relative to its cylinder 2, the track 18 will slide over the peg 19 and relative displacement between the track and peg imparts controlled axial rotation to the piston 1 in accordance with the profile of the track 18. The peg 19 is rotatably mounted in the bearings 20 so that it can rotate by its engagement with the side walls of the track 18 and thereby reduce friction which develops between the peg and the piston. The controlled rotation exhibited by the piston 1 as determined by the shape of the track 18 is transmitted by way of the piston rod 11, channels 15 and bearing systems 16 to the take-off member 12 so that this member rotates in unison with the piston to operate the steering mechanism.

From the aforegoing description it will be apparent that the gear ratio, be it constant or variable, will be determined by the relative form of the track 18 and of the re-circulating ball screw mechanism 1a provided between the shaft 4 and piston 1. In the present embodiment, and as will be usual for vehicle steering gears, the gear assembly will provide a gear ratio reduction (or increased mechanical advantage) between the rotational input to the shaft 4 and the resultant rotational output of the take-off member 12. Although the steering gear will function wholly under manual operation, as previously mentioned, it is intended for use with hydraulic fluid pressure assistance and in such case the axial displacement of the piston 1 relative to the housing 3 is appropriately assisted by hydraulic fluid pressure controlled by the valve means 8.

In a modification (not shown) of the steering gear of the embodiment in FIGS. 1 and 2, a second non-rectilinear track and track follower can be provided between the piston rod 11 and the take-off member 12. In one form of such a modification the track 18 is machined as a rectilinear channel parallel to the longitudinal axis of the piston 1 so that the nut 1 is inhibited from axial rotation by engagement of the peg 19 with the rectilinear channel but such nut will be displaced longitudinally (and without rotation) within the cylinder 2 when the shaft 4 is rotated. In addition, the channels 15 are machined as helical tracks (similarly to the track 18 as shown in FIG. 2) with which the re-circulating ball systems 16 engage so that as the piston rod 11 is displaced axially with the piston 1 and without rotating, rotation is imparted through the helical tracks and the ball systems 16 which co-operate therewith to the take-off member 13. As an alternative to the helical track 15 and co-operating ball systems 16 the piston rod 11 can be coupled to the take-off member 12 through co-operating threads (such as a conventional Acme thread) so that as the piston rod is displaced axially relative to the take-off member 12 the latter is caused to rotate through the co-operating threads. In a further form of the aforementioned modification the steering gear can have both a non-rectilinear track and track follower between the piston rod 11 and the take-off member 12 as mentioned above and a non-rectilinear track and track follower between the piston 1 and the housing 3 (such as the cooperating track 18 and peg 19 as described with reference to FIGS. 1 and 2) so that the gear ratio between rotation of the shaft 4 and the resultant rotation of the take-off member 12 is determined by the combined effect of the two respective non-rectilinear tracks and track followers.

Figure 3:
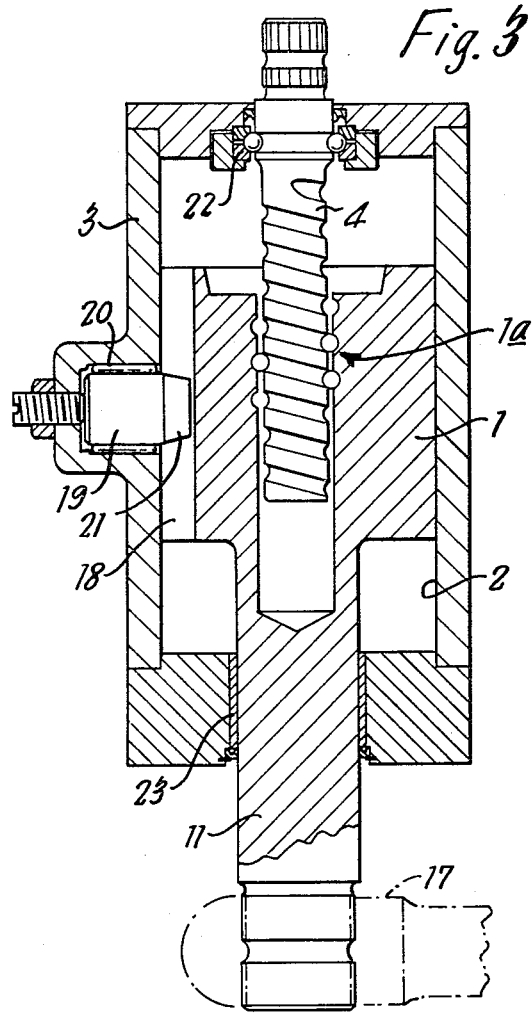
FIG. 3 is a longitudinal section of a second embodiment of a gear assembly according to the invention suitable for use with a drop arm linkage and which gear is intended for wholly manual operation.

The embodiment of the vehicle steering gear shown in FIG. 3 is similar to that previously described with reference to FIGS. 1 and 2 but can be regarded as a much simpler and thereby less expensive structure than the previous embodiments primarily since it is intended for wholly manual operation (that is without power assistance) and the take-off part of the gear provides both axial and rotational displacement. In FIG. 3 the axially rotatable worm threaded shaft 4 extends at one end from the housing 3 where it is appropriately machined for coupling to a rotational steering input component while its other end screw engages with the re-circulating ball piston 1. A bearing 22 rotatably mounts the shaft 4 in the housing 3 and this bearing serves to secure the shaft against axial displacement relative to the housing. The nut 1 has the helical track 18 machined in its cylindrical side face engaging with which track 18 is the peg 19 to restrain rotation of the piston 1. Consequently as the shaft 4 rotates, the piston 1 is driven longitudinally through the cylinder 2 and controlled rotation is imparted to the piston 1 by co-operation between the peg 19 and track 18 being a helix of variable pitch in a similar manner to the embodiment of FIGS. 1 and 2. The cylindrical rod 11 on the piston 1 extends from the housing 3 through a plain bearing 23 for connection to the drop arm 17 so that as the piston 1 is displaced axially and is rotated relative to the housing 2 the rod 11 and drop arm 17 move in unison therewith for effecting a steering manoeuvre.

Figure 4:
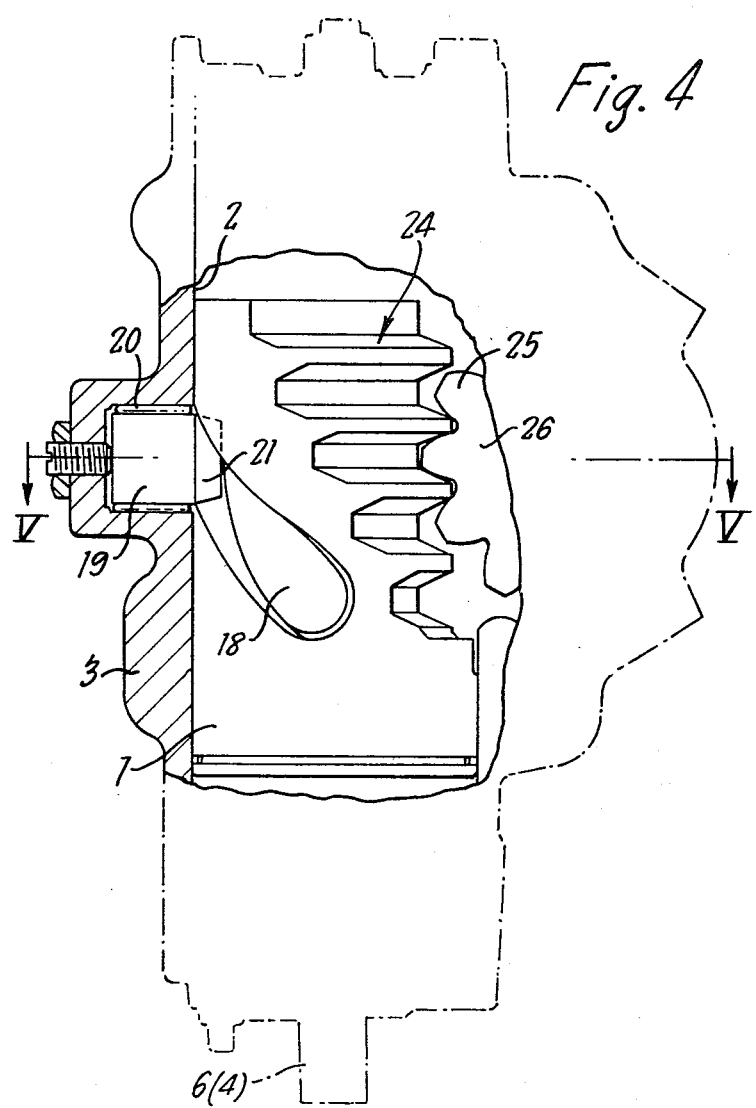
FIG. 4 is a side elevation in part section of a third embodiment of a gear assembly according to the invention as applied to a worm and sector type vehicle steering gear.
Figure 5:
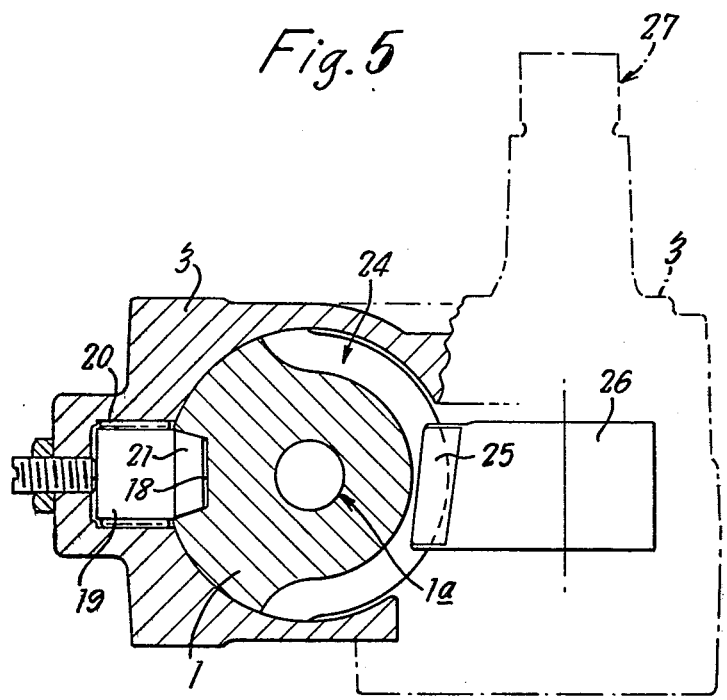
FIG. 5 is a section taken on the line V—V of the steering gear shown in FIG. 4.

In each of the above-described embodiments the steering output is primarily intended to be derived from rotation of a take-off part of the gear (that is rotation of the take-off member 12 in FIG. 1 or rotation of the rod 11 in FIG. 3 which both serve to displace the swing lever 17); the gear however is equally applicable to a steering gear in which steering output is primarily derived from axial displacement of the take-off part and such a gear is the subject of the embodiment illustrated in FIGS. 4 and 5.

The steering gear in FIGS. 4 and 5 is of the kind known in the art as a worm and sector gear and the piston 1 effectively constitutes the worm of such a gear whereby it is provided in its cylindrical surface with an axially extending array of teeth 24 (which may be straight or helical). Engaging with the teeth 24 are complementary teeth 25 of a sector 26 which is rotatably mounted in the housing 3 and is coupled to an output shaft (indicated at 27 in FIG. 5) to impart partial rotation thereto. In use the output shaft 27 will be coupled to a steering linkage, for example through a swing lever mechanism.

The piston 1 is coupled by screw means 1a to a shaft 4 similarly to the previously described embodiments and is restrained from rotating relative to the housing 3 by a co-operating peg 19 and a helical track 18 of variable pitch again similarly to the previously described embodiments. It will be apparent that axial displacement of the piston 1 relative to the housing 3 in the embodiment of FIGS. 4 and 5 can be achieved with power assistance (as in the embodiment of FIGS. 1 and 2) or wholly manually (as in the embodiment of FIG. 3) so that upon rotation of the shaft 6 (or 4 as the case may be) the piston 1 is displaced longitudinally in the cylinder 2 and relative to the housing 3. During such displacement of the nut relative to the sector 26, the engagement of the teeth 25 of the sector with the array of worm teeth 24 of the piston 1 cause the sector to rotate relative to the housing and thereby rotate the output shaft 27 to effect a steering manoeuvre. During the aforementioned axial displacement of the piston 1 in FIG. 4 it will be realised from the previous discussion that the co-operating peg 19 and helical track 18 causes the nut 1 to rotate axially relative to the housing. This latter rotation causes the worm teeth 24 to be displaced circumferentially with the piston 1 and to slide relative to and across the sector teeth 25. This latter effect changes the amount of axial displacement to which the piston 1 would otherwise be subjected by rotation of the input shaft 6 (or 4) and thereby determines the ratio between the input of the gear to the shaft 6 or 4 and the output part of the gear provided by the array of worm teeth 24.

It will be seen from FIG. 4 that the helical track 18 is located substantially diametrically opposite to the array of worm teeth 24. The teeth 24, conveniently, are all of the same peripheral length and are circumferentially displaced relative to each other (to provide the echelon appearance in FIG. 4) to ensure that throughout the permissible extent of rotation exhibited by the nut 1 the teeth 24 will be maintained in engagement with the sector teeth 25.

In each of the aforegoing embodiments and particularly as shown in FIGS. 2 and 4 the non-rectilinear track 18 is regarded as being of constant helical formation so that the gear ratio for the steering gear is substantially constant for the operative stroke of axial displacement between the nut 1 and the housing 3 (which in use would correspond to the steerable road wheels of a vehicle being moved from lock to lock). It will be realised however that the gear ratio can vary for the steering gear assembly throughout or during part of, the operative stroke of the piston 1 by appropriately varying the shape of the track 18; for example in the FIG. 4 embodiment the track 18 may have a centre portion of its axial extent which is rectilinear and substantially parallel to the axis of the piston 1 and end portions of helical profile so that when the peg 19 is in engagement with and sliding through the centre portion the gear ratio is substantially constant and no rotation is imparted to the piston 1 and when the peg 19 moves into engagement with and slides through a helical end portion of the track 18 the piston 1 is caused to rotate to vary the gear ratio accordingly.

Figure 6:
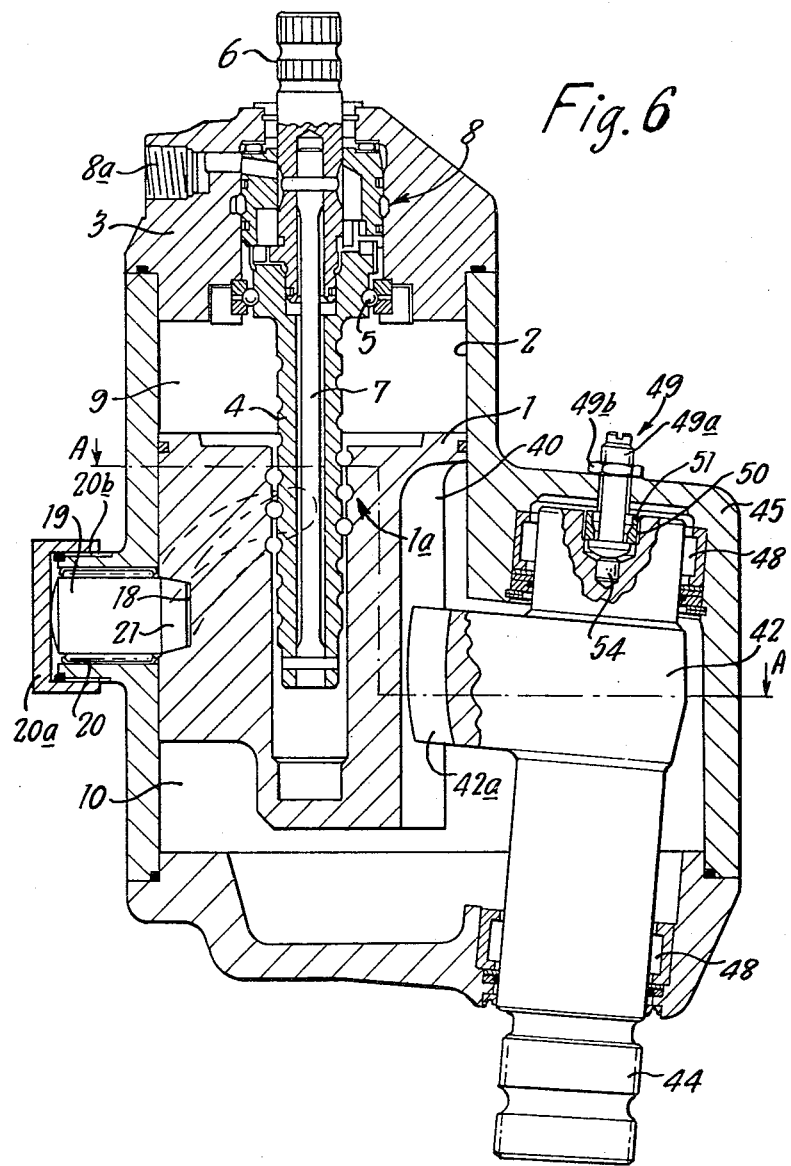
FIG. 6 is a longitudinal section through a fourth embodiment of a gear assembly according to the invention having a take-off part in a side-by-side relationship with respect to the input shaft of the assembly.

The steering gear of the embodiment of FIG. 6 has a cylindrical piston 1 which is axially slidable in a longitudinally extending cylinder 2 formed by a gear housing 3. The piston 1 is formed by a re-circulating ball nut which is coupled thrugh a re-circulating ball and worm thread system 1a with a shaft 4 co-axial with the piston 1. The shaft 4 is axially rotatable in bearings 5 relative to the housing 3 and is retained against axial displacement relative to the housing 3 so that, if the piston 1 is restrained against axial rotation relative to the housing 3, upon rotation of the shaft 4 the piston 1 is displaced longitudinally within the cylinder 2. Co-axial with the shaft 4 and mounted tanden therewith is an input shaft 6 which extends from the housing 3. The input shaft 6 is mounted for rotation relative to the housing 3 and is connected to the shaft 4 by a torque rod 7 so that upon rotation of the input shaft 6 in response to a steering input, rotation is imparted to the shaft 4 whilst the torque rod 7 permits a limited amount of rotational displacement of the shaft 6 relative to the shaft 4. This latter rotational displacement between the shafts 6 and 4 is utilised to control torque responsive valve means shown generally at 8 having a fluid pressure input port 8a. The piston 1 forms with its cylinder 2 axially opposed chambers 9 and 10 to which hydraulic fluid under pressure is intended to be directed and exhausted as appropriate for a double acting piston and cylinder arrangement. This control of hydraulic fluid is effected by the valve means 8 to pressurise one of the chambers 9 and 10 while the other is exhausted to ensure that fluid pressure assistance is provided for displacement of the piston 1 in the appropriate longitudinal direction in accordance with that in which it is screw driven by rotation of the shaft 4. The torque valve 8, the coupling between the shafts 4 and 6 and the fluid control system to the chambers 9 and 10 can be conventional as for power-assisted steering gear and an appropriate arrangement is described in our associate company TRW Inc's British Patent Specification No. 1,496,734.

As previously mentioned, the piston 1 will be driven axially through the cylinder 2 upon rotation of the shaft 4 and axial rotation of the piston 1 is controlled and provided by an extending track 18 and a track follower 19 engaging therewith. The track 18 is machined in the cylindrical surface of the piston 1 and is of longitudinally extending helical form as shown by the dotted lines. The track follower 19 is formed by a substantially cylindrical peg the axis of which extends radially relative to that of the piston 1 and is secured relative to the housing 3. The peg 19 is mounted to exhibit rotation about its axis and relative to the housing 3, in needle rollers 20, retained in the housing by a cap 20a and the radially inner end of the peg 19 is provided with a frusto conical nose 21 which co-operates with the track 18.

By providing the helical track 18 and the peg 19 which co-operates therewith, the piston 1 has controlled axial rotation. This occurs when the shaft 4 is rotated to drive the piston 1 longitudinally relative to its cylinder 2, the track 18 will slide over the peg 19 and relative displacement between the track and peg imparts controlled axial rotation to the piston 1 in accordance with the profile of the track 18. The peg 19 is rotatably mounted in the bearings 20 so that it can rotate by its engagement with the side walls of the track 18 and thereby reduce friction which develops between the peg 19 and piston 1.

From the aforegoing description it will be apparent that the gear ratio, be it constant or variable will be determined by the relative form of track 18 and of the recirculating ball mechanism 1a provided between the shaft 4 and piston 1. In the present embodiment (of FIG. 6) and, as will be usual for vehicle steering gears, the gear assembly will provide a gear ratio reduction (or increased mechanical advantage between the rotational input to the shaft 4 and the resultant rotational output of a take-off member 42).

On the side of piston 1 remote from peg 19 a plurality of splines (one of which is shown) 40 are provided. These splines extend substantially the length of the piston 1. In contact with the splines 40 of piston 1 are teeth 42a of the take-off member 42 which is in the form of a sector having extended therefrom an output shaft 44 inclined at a small acute angle with respect to the longitudinal axis of the input shaft 6. The take-off member 42 is mounted for rotation about its axis in an extension 45 of the housing 3; the extension 45 is in side by side relationship with respect to the input shaft 6. As the piston can only be rotated between maximum rotation displacements determined by the track 18 the minimum number of splines 40 and teeth 42a must be such as to allow engagement to be maintained between the splines 40 during a complete cycle of their rotational displacement.

The output shaft 44 is mounted in the extension 45 of the housing 3 by bearings 48 which allow the shaft 44 to rotate freely.

At the lower end of the extension 45 of housing 3 there is an opening through which shaft 44 extends in a sealed manner. At the upper end of the extension 45 of housing 3 a screw adjuster mechanism 49 is located, which comprises a bolt 49a and a nut 49b. The nut 49b abuts the wall of extension 45 of the housing 3 and upon tightening or loosening causes longitudinal displacement of the shaft 44.

Figure 6A:
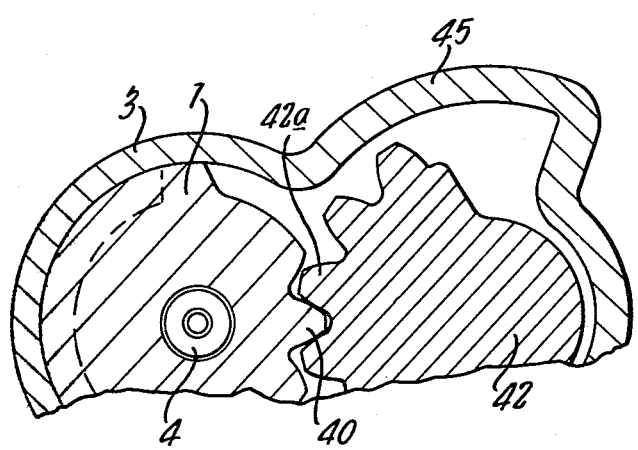
FIG. 6a is a part sectional view taken on the line A—A of the gear assembly in FIG. 6.

The bolt 49a extends through an opening in the extension 45 of housing 3 and at the end remote from the nut 49b a plug 51 preferably of steel is located within a recess 50, the plug 51 being externally threaded to engage with an internal thread in the recess 50. The bolt 49a has a head with a part-spherical end surface and this head abuts a small plug 54 which is pressed into a counterbore in the bottom of recess 50. The extension 45 of housing 3 is threaded to receive the bolt 49a so that if nut 49b is slackened the bolt 49a can rotate in either direction. If the bolt 49a is rotated in a clockwise direction the bolt 49a will move in a downward direction i.e. towards the plug 54 so that the bolt 49a presses against the plug 54 and causes the shaft 44 to move along its own axis away from bolt 49a. If rotation of the bolt 49a is in an anti-clockwise direction then the underside of the head of the bolt 49a abuts the end of the threaded plug 51 which remains fixed in position and the shaft 44 is lifted in FIG. 6. The purpose of this adjustment is to enable the mesh of gear teeth 42a with splines 40 to be optimised due to the fact that shaft 44 is at an inclined angle with respect to the piston 1 of the longitudinal axis. As can be seen from FIG. 6a, if the teeth 42a are to contact the splines 40 in an optimum position so as to cause minimum strain on the teeth 42a, the shaft 44 must be capable of fine adjustment.

I claim:
1. A gear assembly comprising
  a displaceable member which is movable along a longitudinally extending axis relative to a housing and is restrained from axial rotation relative to the housing, said displaceable member being coupled to the housing by a first coupling means to impart controlled axial rotation of the displaceable member relative to the housing, an axially rotatable input part which is secured against axial displacement relative to the housing and is coupled to said displaceable member so that rotation of the input part effects axial displacement of the displaceable member, a take-off part, laterally spaced and in side-by-side relationship with respect to the input part, the take-off part having an output part capable of controlled axial rotation relative to the housing, said displaceable member being coupled to the take-off part by a second coupling means, said second coupling means being adapted to cause axial rotation of the take-off part in response to controlled axial rotation of the displaceable member.

2. A gear assembly as claimed in claim 1 which is a variable ratio gear assembly.

3. A gear assembly as claimed in claim 2, in which the assembly is power assisted.

4. A gear assembly as claimed in claim 1, in which the displaceable member is in the form of a nut driven longitudinally with respect to the housing.

5. A gear assembly as claimed in claim 4, in which the nut includes longitudinally extending splines.

6. A gear assembly as claimed in claim 4, in which a non-rectilinear track and track follower are arranged between the nut and the housing so that as the nut is driven longitudinally relative to the housing additional controlled axial rotation is imparted to the nut.

7. A gear assembly as claimed in claim 4 in which the nut is inhibited from exhibiting axial rotation relative to the housing whilst being displaced longitudinally through the housing by rotation of the input part.

8. A gear assembly as claimed in claim 7 in which the inhibition of rotation of the nut is effected by a projection in the housing which engages and is longitudinally slidable along a rectilinear channel in the nut, which channel is parallel to the longitudinal axis.

9. A gear assembly as claimed in claim 4 in which inhibition of rotation of the nut is effected by a projection in the housing which engages in and is longitudinally slidable along a rectilinear channel in the nut, which channel extends parallel to the longitudinal axis, the output part being rotated by relative axial displacement between the track and track follower.

10. A gear assembly as claimed in claim 1 in which the track is in the form of a longitudinally extending non-rectilinear groove and the track follower is in the form of a peg which engages within the groove.

11. A gear assembly as claimed in claim 1 in which the track and the track follower can be in the form of co-operating threads.

12. A gear assembly as claimed in claim 1, in which a predetermined gear ratio between the displaceable member and the take-off part is imparted by the shaping of the track and the selection of a screw coupling between the input part and the displaceable member.

13. A gear assembly as claimed in claim 1 in which the track is a helix of variable pitch and the take-off includes a peg which engages the track and slides therealong during relative longitudinal displacement.

14. A gear assembly as claimed in claim 1, in which the output part is rotatable about its own axis and is secured against axial displacement relative to the housing.

15. A gear assembly as claimed in claim 1, in which the first coupling provides additional controlled rotation of the output part.

16. A gear assembly as claimed in claim 1 in which the displaceable member is in the form of a piston which is longitudinally displaceable in a piston cylinder formed by the housing, and which piston together with its cylinder constitutes a double acting cylinder device having opposing chambers, and wherein valve is provided which is responsive to rotation of the input part, said valve means directing and exhausting fluid under pressure from said opposing chambers to provide assistance in displacement of the piston.

17. A variable ratio gear assembly comprising a housing, a displaceable member which is movable along a longitudinally extending axis relative to said housing and is retrained from axial rotation relative thereto;

an axially rotatable input part which is secured against axial displacement relative to said housing and is coupled to said displaceable member so that rotation of the input part effects an axial displacement of the displaceable member;

a take-off part capable of controlled rotation relative to said housing which rotation provides an output of the gear assembly;

first coupling means for coupling said displaceable member to said housing;

second coupling means for coupling said displaceable member to said take-off part;

one of said coupling means imparting controlled rotational movement to the take-off part and comprising an axially extending track of one or more curved portions and a track follower which cooperates therewith, one of said track and track follower being secured relative to the displaceable member for longitudinal displacement therewith and the other being secured relative to the housing and against longitudinal displacement, said one or more curved portions being variable along its extent to vary the ratio between the rotation of said input part and rotation of said take-off part.

* * * * *